Jan. 20, 1925.                                              1,523,612
J. I. SANKSTONE
BAIT HOLDER
Filed Feb. 7, 1923

Witnesses:                                    Inventor:
                                          Jacob I. Sankstone
                                       By Joshua R. H. Potts
                                                    Attorney Patented Jan. 20, 1925.

1,523,612

UNITED STATES PATENT OFFICE.

JACOB I. SANKSTONE, OF ARCOLA, MISSISSIPPI.

BAIT HOLDER.

Application filed February 7, 1923. Serial No. 617,506.

*To all whom it may concern:*

Be it known that I, JACOB I. SANKSTONE, a citizen of the United States, and a resident of the city of Arcola, county of Washington, and State of Mississippi, have invented certain new and useful Improvements in Bait Holders, of which the following is a specification.

My invention relates to novel improvements in bait holders and has for its principal object the provision of an improved construction of this character which will be highly efficient in use and economical in manufacture.

Other objects will appear hereinafter.

The invention consists in the combinations and arrangements of parts hereinafter described and claimed.

Figure 1:
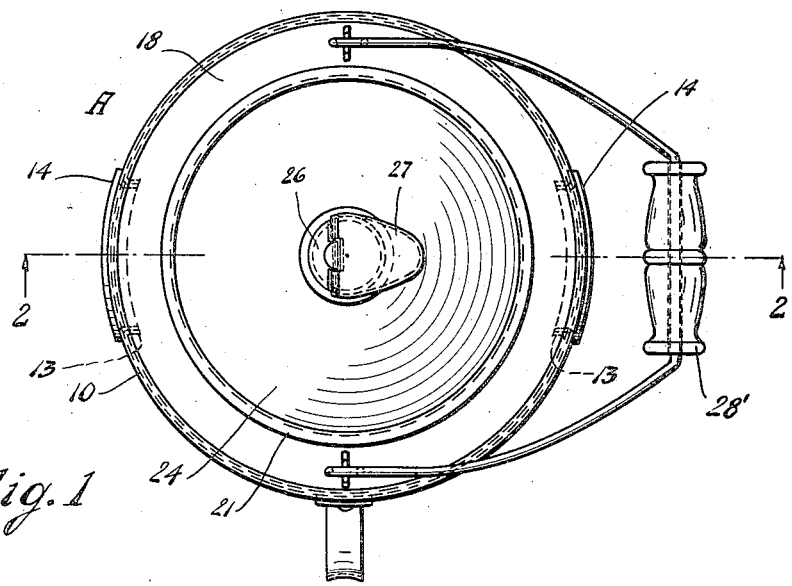
Figure 2:
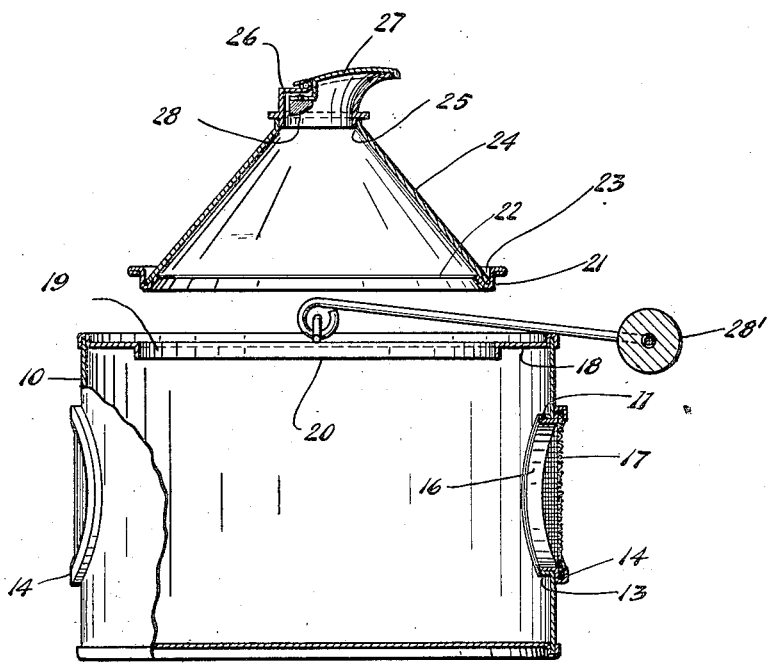

The invention will be best understood by reference to the accompanying drawings forming a part of this specification, and in which, Fig. 1, is a top plan view of a bait holder embodying the invention; and Fig. 2, is a sectional view of the same taken substantially on line 2—2 of Fig. 1, showing the cover of the bait holder out of closing position.

Referring to the drawings, A indicates my bait holder which comprises a receptacle 10 which receives the bait. Formed in the opposite corresponding side walls of the receptacle 10 are openings 11 each having their peripheral edges bent inwardly to form an annular flange 13. A closure is provided for each opening and includes a frame 14, having an annular flange 16 for engagement with the adjacent flange 13. The frame carries a screen 17 to permit entrance of air to the interior of the receptacle, and the frame is preferably constructed so that the same can be conveniently removed when it is desired to clean the interior of the receptacle 10. Formed in the top wall 18 is an opening 19 having its peripheral edges bent inwardly to form an annular flange 20. Insertable in the opening 19 and adapted to rest upon the top wall 18 is an annular ring 21 having its inner peripheral edges 22 bent upwardly to form a V-shaped groove 23. Fixed to the upwardly bent portion of the ring 21 and resting in the groove 23 is a conical shaped closure member or covering 24 having an opening 25 formed in the apex thereof, said opening being closed by a cap 26 having a pivotally mounted trap door 27, the closing of the door being accomplished through the medium of a weight 28. While the cap 26 illustrated in the drawings is the preferred form of construction, it will be apparent that any other cap of approved type will serve the purposes.

Associated with the receptacle 10 and fixed to the top wall 18 thereof is a suitable handle 28' which facilitates carrying the holder about.

The bait, such as crickets and the like, are placed in the receptacle and when it is desired to use the bait the holder is tilted at an angle whereupon the bait is discharged through the cap 26, the door opening by gravity upon tilting of the holder and closes again by means of the weight, and is of such construction that it will enable one to take the bait from the holder singly.

The bait when in the holder is kept in a fresh state by the admission of air through the openings 11.

From the description herein and with reference to the drawing, it is apparent that I provide a bait holder which will be economical in manufacture and which is of such construction that the same can be carried about conveniently.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A bait holder including a receptacle having an opening formed in the top wall thereof, a conical closure member with a flanged ring member at its lower portion for snugly fitting within said opening, said conical member being arranged for conveniently pouring bait therefrom, and a self-closing door at the upper end of said conical member.

2. A bait holder including a receptacle having an opening formed in the top wall thereof, a ring member having its inner peripheral edges bent to form a V-shaped groove mounted in said opening, a closure member having its peripheral edges mounted in said groove and fixed to said ring member, and screened openings in the sides of said receptacle.

3. A bait holder including a receptacle having an opening formed in the top wall thereof, a member having its inner peripheral edges bent to form a V-shaped groove mounted in said opening, a conical shaped closure member having its lower peripheral edges mounted in said groove and fixed to said member, and a self-closing door at the apex of said closure member.

4. A bait holder including a receptacle having an opening formed in the top wall thereof and provided with means for the admission of air to the interior thereof, a member insertable in said opening, a conical shaped closure member carried by said member, a self-closing door at the apex of said closure member, and a handle fixed to said receptacle.

5. A bait holder including a receptacle having an opening formed in the top wall thereof, a closure member with a conical body portion having annular flanged means at its lower portion to fit snugly in said opening, a cap secured at the upper end of said conical portion, and a self-closing door at the upper end of said cap, said conical portion and cap being arranged for convenient pouring of bait from said receptacle.

In testimony whereof I have signed my name to this specification in the presence of two subscribing witnesses.

JACOB I. SANKSTONE.

Witnesses:
PAUL T. NEELY, M. D.,
LELAND HUME.